US008289311B2

(12) United States Patent
Jo

(10) Patent No.: US 8,289,311 B2

(45) Date of Patent: Oct. 16, 2012

(54) DISPLAY AND DRIVING METHOD THEREOF WITH BLACK DATA ALIGNMENT

(75) Inventor: Sung Hak Jo, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 815 days.

(21) Appl. No.: 11/633,492

(22) Filed: Dec. 5, 2006

(65) Prior Publication Data

US 2007/0146384 A1 Jun. 28, 2007

(30) Foreign Application Priority Data

Dec. 26, 2005 (KR) ........................ 10-2005-0129596

(51) Int. Cl.

*G06F 3/038* (2006.01)
*G09G 3/30* (2006.01)
*G09G 3/36* (2006.01)
*G09G 5/10* (2006.01)

(52) U.S. Cl. .............. 345/213; 345/78; 345/89; 345/99; 345/690

(58) Field of Classification Search ........................ None
See application file for complete search history.

(56) References Cited

U.S. PATENT DOCUMENTS 7,505,018 B2 * 3/2009 Feng et al. ........................ 345/89
2002/0097252 A1 * 7/2002 Hirohata ........................ 345/690
2004/0263462 A1 * 12/2004 Igarashi ........................ 345/98
2005/0259064 A1 * 11/2005 Sugino et al. ................. 345/102
2006/0007081 A1 * 1/2006 Chien et al. ..................... 345/87
2006/0044241 A1 * 3/2006 Yuh-Ren et al. ................ 345/89
2007/0120793 A1 * 5/2007 Kimura ........................... 345/89

* cited by examiner

*Primary Examiner* — Bipin Shalwala
*Assistant Examiner* — Keith Crawley
(74) *Attorney, Agent, or Firm* — McKenna Long & Aldridge LLP

(57) ABSTRACT

The display device may include a data aligning part that analyzes a gray level of input data and inserts black data into frame data having less than a designated reference gray level; and a driver that displays the data from the data aligning part in a display panel.

10 Claims, 11 Drawing Sheets

DISPLAY AND DRIVING METHOD THEREOF WITH BLACK DATA ALIGNMENT

This application claims the benefit of Korean Patent Application No. 10-2005-0129596, filed on Dec. 26, 2005, which is hereby incorporated by reference for all purposes as if fully set forth herein.

BACKGROUND OF THE INVENTION

1. Field of the Invention

The present invention relates to a display device, and more particularly to a display device adapted to minimize brightness deterioration and motion blurring in a motion picture, and a driving method thereof.

2. Description of the Related Art

In a hold type display device, such as a liquid crystal display (LCD) or an organic light emitting diode (OLED), a blurring phenomenon may occur. The blurring phenomenon is characterized in that a screen is unclear and blurry when a motion picture is playing. This is caused because a data voltage is maintained in a pixel. This will be explained in conjunction with FIGS. 1 and 2 that represent data characteristics of an LCD device and a cathode ray tube (CRT).

A CRT device is an impulse type display device. The data characteristic of the CRT, as shown in FIG. 1, displays data by emitting phosphorus light for a very short time in an early stage of one field period. Later stages of the field period are pause intervals. In contrast, in the LCD device, as shown in FIG. 2, data is received during a scanning period of one field period when a scan high voltage is supplied. The data is maintained in a non-scanning period for the majority of the field period.

Accordingly, a perceived image in a motion picture is clearly displayed in the CRT. In contrast, in the LCD device, the motion picture display is blurred by a blurring phenomenon caused because a data voltage is maintained in a pixel. The difference between the actual image and the perceived image results from an integration effect of the image which temporarily lasts in an eye of a viewer after movement on the display. Accordingly, even though the response speed of the LCD device is fast, an observer sees a blurred screen because of a disparity between the movement of the eye and the static image of each frame.

To decrease the motion picture blurring of the LCD device of the related art, a method has been proposed in which a holding time is reduced and black data is inserted for a portion of the frame period, as shown in FIG. 3.

This motion blurring relaxation method reduces the holding time of frame data D1-D5, shown in FIG. 4, within each frame and inserts black data B1-B5, as shown in FIG. 5. That is, for each frame that one of the frame data D1-D5 is inserted into, one of a black data B1-B5 is inserted. Thereby, an LCD device is driven by a pseudo-impulse that relaxes the motion blurring phenomenon. Accordingly, as shown in FIG. 3, because of the reduced holding time, the gray level of the input data is expressed for about 60% of each frame while the gray level of the inserted black data B1-B5 is expressed for about 40% of each frame.

However, the motion blurring problem can only be resolved to a certain extent by the motion blurring relaxation method shown in FIGS. 3 and 5. Because in this method, the data holding time of frame data D1-D5 of each frame is reduced and black data B1-B5 is inserted, the brightness BDI of the picture is remarkably decreased, as shown in FIG. 6.

SUMMARY OF THE INVENTION

Accordingly, the present invention is directed to a display and driving method thereof that substantially obviates one or more problems due to limitations and disadvantages of the related art.

An advantage of the present invention is to provide a display device adapted to minimize brightness deterioration, and a driving method thereof.

Another advantage of the present invention is to provide a display device adapted to minimize motion blurring in a motion picture in a hold type display device, and a driving method thereof.

Additional features and advantages of the invention will be set forth in the description which follows, and in part will be apparent from the description, or may be learned by practice of the invention. These and other advantages of the invention will be realized and attained by the structure and method particularly pointed out in the written description and claims hereof as well as the appended drawings.

To achieve these and other advantages and in accordance with the purpose of the invention, as embodied and broadly described, a display device includes a data aligning part that analyzes a gray level of input data and inserts black data into data having less than a designated reference gray level to align data; and a driver that displays the data from the data aligning part in a display panel.

In another aspect of the present invention, a displaying method includes aligning data by analyzing a gray level of input data and inserting black data into data having less than a designated reference gray level; and displaying the aligned data in a display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention. In the drawings.

DETAILED DESCRIPTION OF THE ILLUSTRATED EMBODIMENTS

Reference will now be made in detail to exemplary embodiments of the present invention, examples of which are illustrated in the accompanying drawings. Wherever possible, the same reference numbers will be used throughout the drawings to refer to the same or similar parts.

Figure 7:
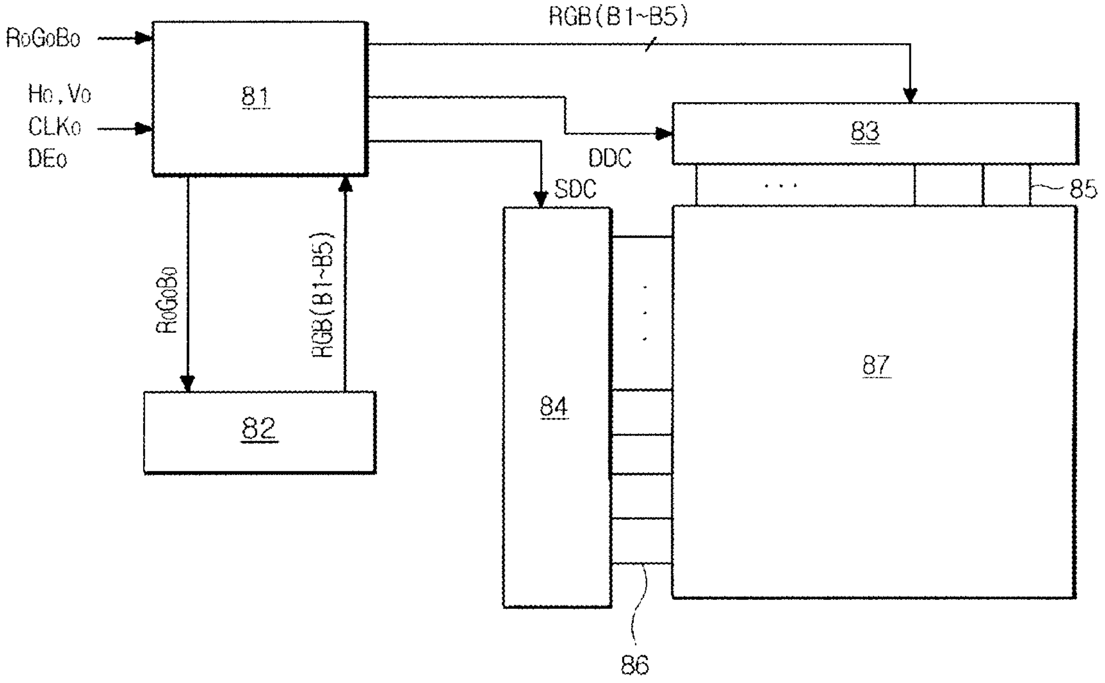
FIG. 7 is a block diagram representing a display device according to the present invention.

Referring to FIG. 7, a display device according to the present invention includes a display panel 87 where data lines 85 cross scan lines 86 to form a plurality of pixels. Also shown are a data driver 83 that supplies data to the data line 85 of the display panel 87, a scan driver 84 that supplies a scan pulse to the scan line 86 of the display panel 87, a data aligning part 82 that inserts black data only when there exists less than a designated reference gray level, and a timing controller 81 that controls the data driver 83 and the scan driver 84 and supplies the data RGB(B1-B5) from the data aligning part 82 to the data driver 83.

In the display panel 87, the data lines 85 and the scan lines 86 are formed to cross each other. Thus, pixels are arranged in a matrix. The display panel 87 may be used in a hold type display device for an LCD panel or OLED panel.

The timing controller 81 samples digital video data R0G0B0 in accordance with a pixel clock and supplies the data R0G0B0 to the data aligning part 82.

The timing controller 81 may include a signal controller. Accordingly, the timing controller 81 generates a scan control signal SDC that controls the scan driver 84, a data control signal DDC that controls the data driver 83 and a control signal that controls the data aligning part 82 by employing various signals.

Figure 8:
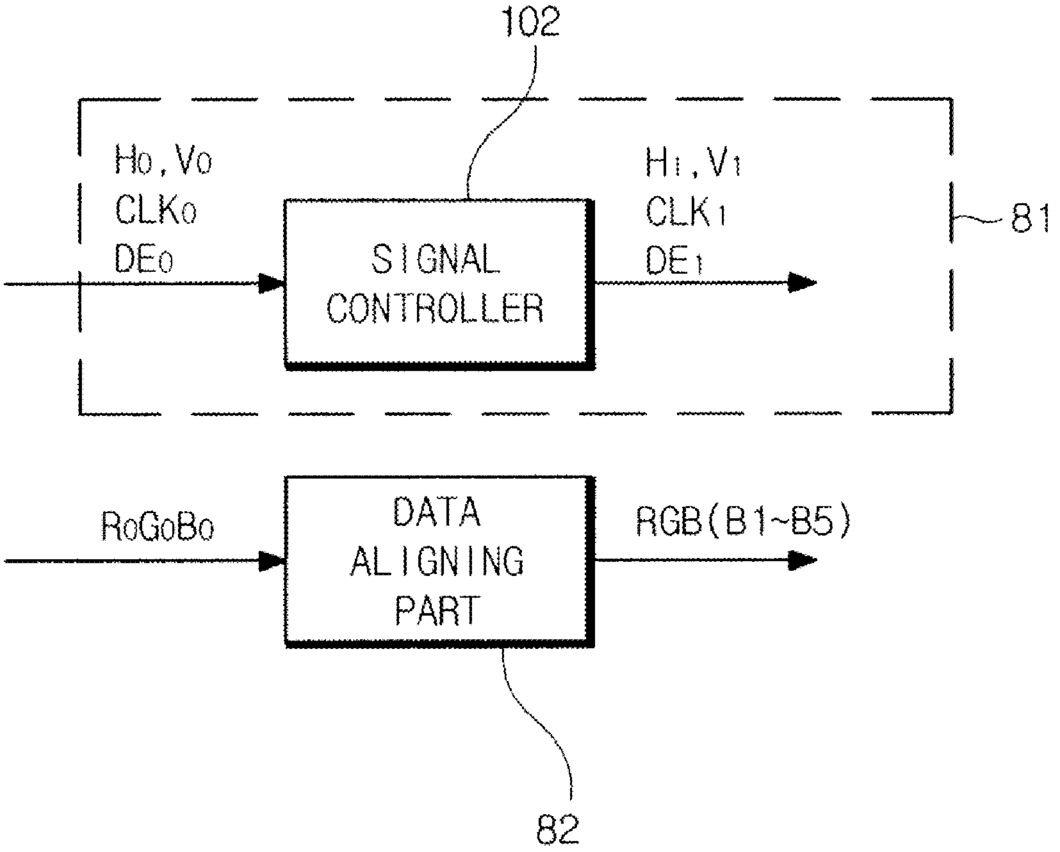
FIG. 8 is a block diagram representing a data aligning part and a signal controller of a timing controller of FIG. 7.

The signal controller 102 of the timing controller 81, as shown in FIG. 8, generates a second vertical/horizontal synchronization signal V1, H1, a second clock signal DCLK1 and a second data enable signal DE1. These signals are synchronized with the data RGB(B1-B5) from the data aligning part 82 by employing an input vertical/horizontal synchronization signal V0, H0, an input first clock signal CLK0 and an input first data enable signal DE0. Herein, the second vertical/horizontal synchronization signal V1, H1, the second clock signal DCLK1 and the second data enable signal DEI are modulation signals V1, H1, CLK1 for driving the data driver 83 and the scan driver 84. The data driver 83 and the scan driver 84 may be driven at double the speed of the related art (120 Hz). Further, the signal controller 102 acts to delay the second vertical/horizontal synchronization signal V1, H1, the second clock signal DCLK1 and the second data enable signal DE1, modulated for one frame, for a fixed period so that the signals may be synchronized with the aligned data RGB (B1-B5) from the data aligning part 82.

Figure 9:
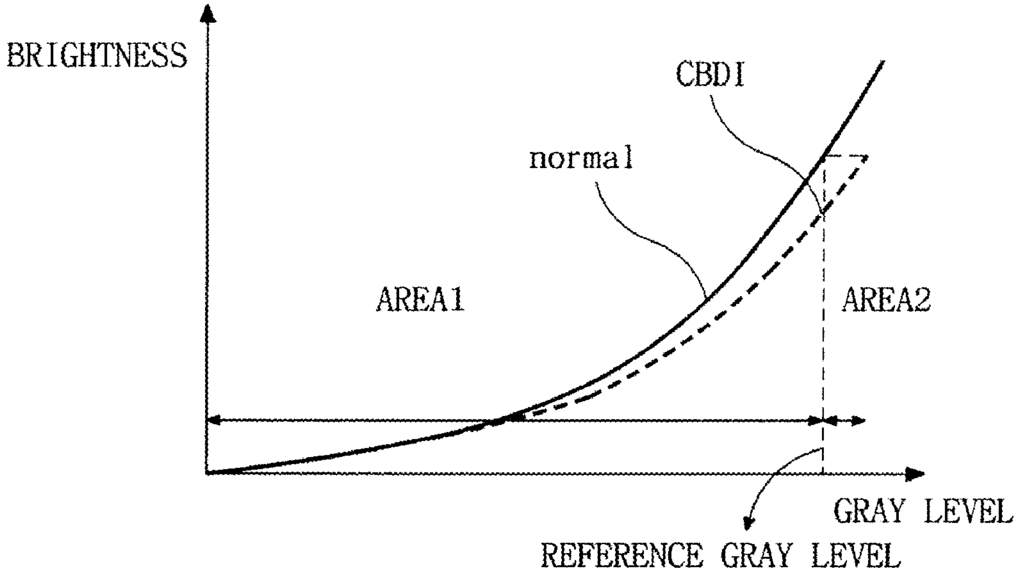
FIG. 9 is a graph illustrating brightness difference between data alignment of a normal state and data alignment according to the present invention.

The data aligning part 82 analyzes the gray level of the video data R0G0B0 from the timing controller 81, and does not insert black data for the video data R0G0B0 if there exists at least a designated reference gray level. However, the data aligning part 82 inserts black data when the video data R0G0B0 is less than the designated gray level. Herein, the designated reference gray level value, as shown in FIG. 9, may be a gray level value between a gray level area 1, in which a gray level expression is possible and there is no brightness deterioration even though black data is inserted, and a gray level area 2, in which a motion blur effect is low because there exists a low frequency in the motion picture. The designated reference gray level value may be any gray level value between the highest brightness obtained by inserting black data in the related art method (BDI in FIG. 6) and a brightness higher than that. The designated reference gray level value may be obtained by inserting black data between adjacent input data in each gray level and determining the brightness and motion blurring. This brightness and motion blurring is compared to the brightness and motion blurring obtained when black data is not inserted. In this manner, the designated reference gray level value may be obtained.

The data aligning part 82 may be embedded within the timing controller 81.

The data driver 83 may include a shift register, a register that temporarily stores data RGB(B1-B5) from the timing controller 81, a latch that stores data RGB by lines and simultaneously outputs the stored data RGB(B1-B5) of one line portion in response to a clock signal from the shift register, a digital/analog converter that selects an analog positive/negative gamma compensation voltage corresponding to the data RGB(B1-B5) value from the latch, a multiplexer that selects a data line 85 to which the positive/negative gamma compensation voltage is supplied, and an output buffer connected between the multiplexer and the data line.

The data driver 83 receives the data RGB(B1-B5) and supplies the data RGB(B1-B5) to the data lines 85 of the display panel 87 under control of the timing controller 81.

When there exists less than the designated reference gray level, the gamma voltage supplied to the digital/analog converter of the data driver 83 is set for each gray level while black data is inserted between the video data RGB in the gray level area 1 of FIG. 9. However, when at least the designated reference gray level exists, the gamma voltage is set for each gray level while black data B1-B5 is not inserted between the video data RGB in the gray level area 2 of FIG. 9.

Figure 10:
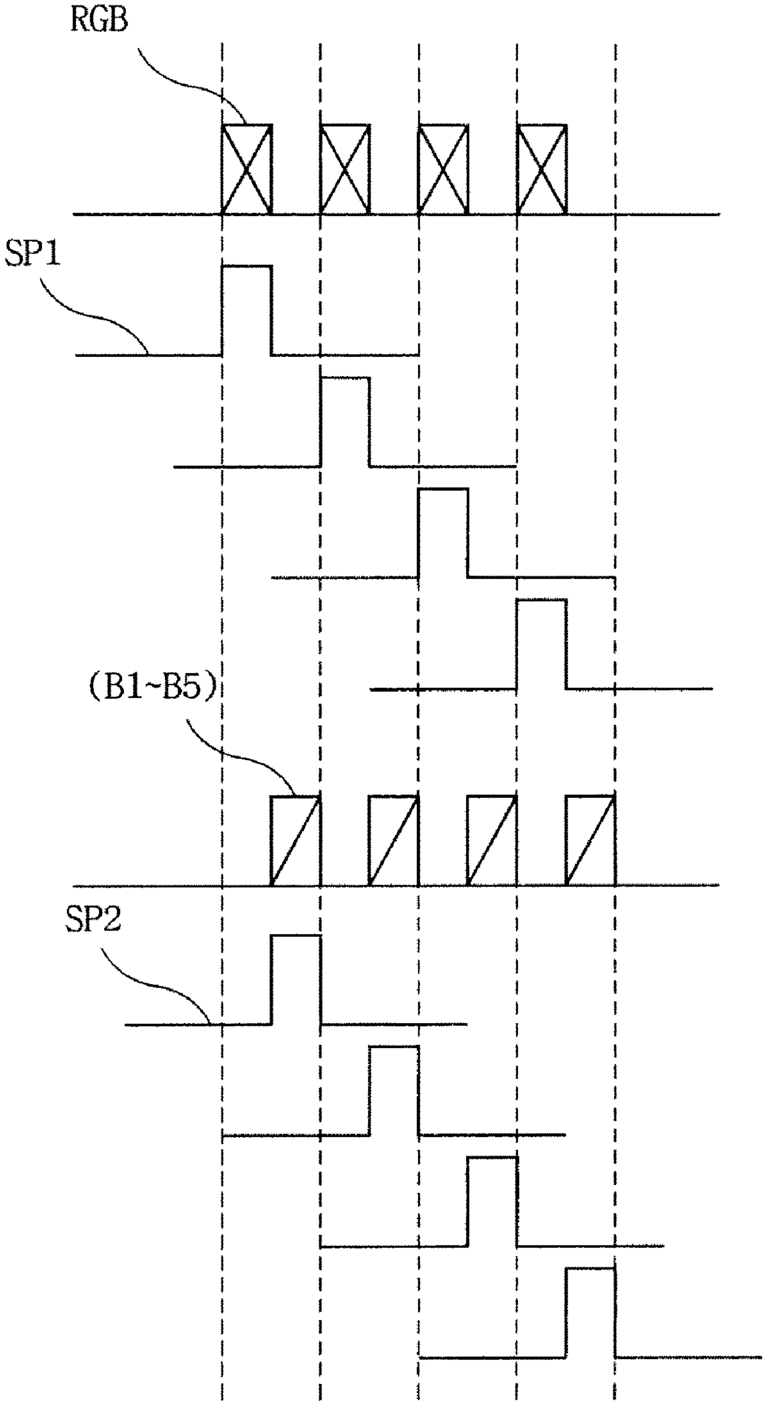
FIG. 10 is a waveform diagram representing scan pulses synchronized with data from a data driver.

The scan driver 84 sequentially generates a scan pulse in response to a scan control signal SDC from the timing controller 81. Herein, the scan driver 84 is driven at double the related art speed, thus a first scan pulse SP1 synchronized with the video data RGB is supplied to the display panel and a second scan pulse SP2 synchronized with the black data B1-B5 is supplied to the display panel 87, as shown in FIG. 10.

Figure 11:
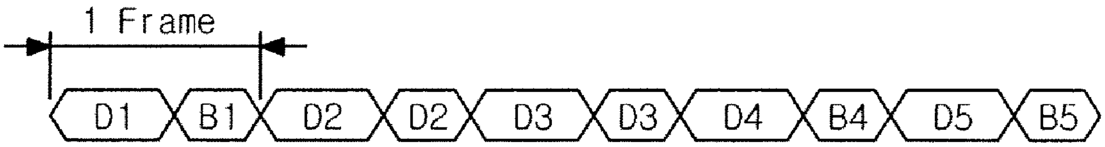
FIG. 11 is a diagram representing an example of the data alignment shown in FIG. 8.

FIG. 9 illustrates a brightness difference between data alignment of a normal state and data alignment according to the present invention. FIG. 11 represents an example of a data alignment according to the present invention.

Figure 1:
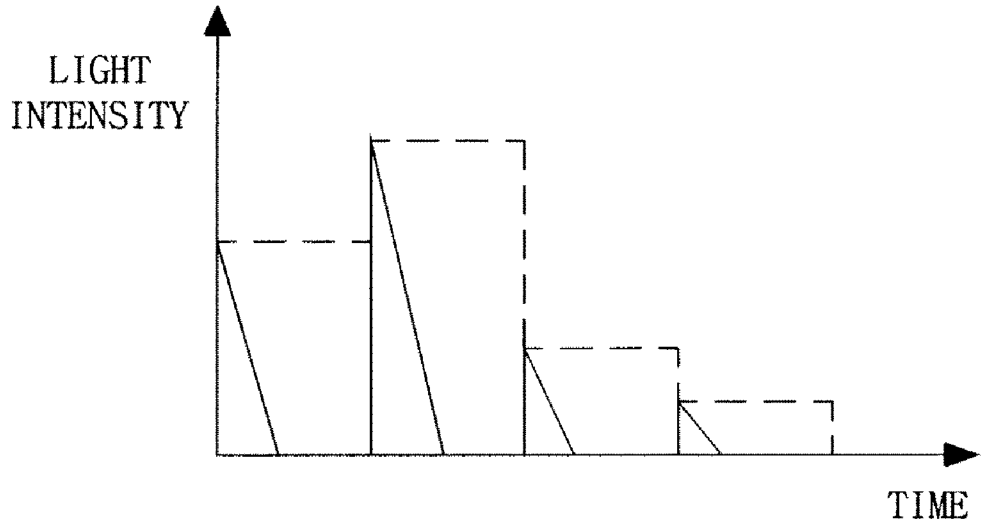
FIG.1 RELATED ART
FIG. 1 is a diagram representing a light emission characteristic of a cathode ray tube of the related art.
Figure 2:
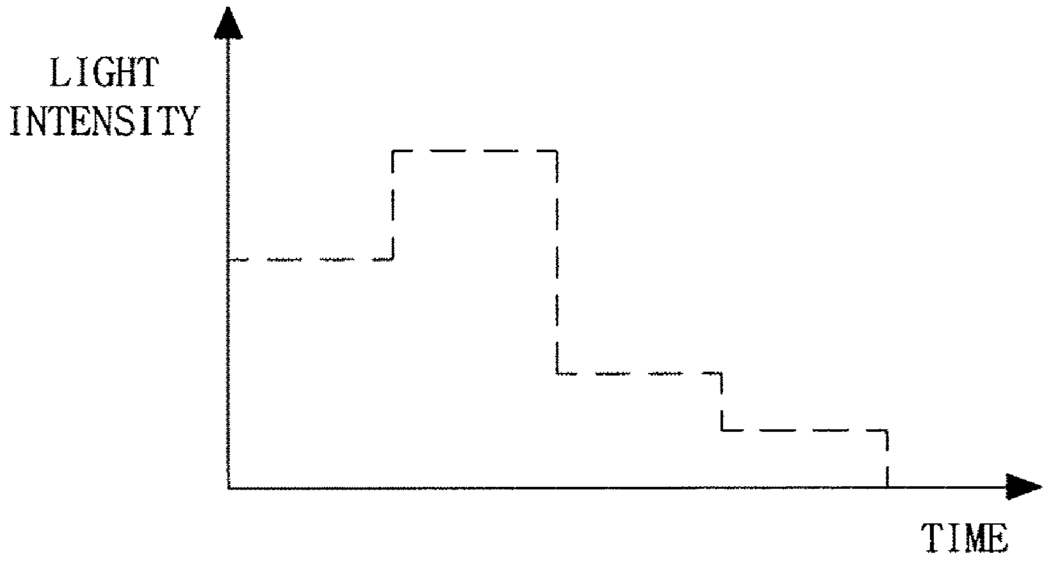
FIG.2 RELATED ART
FIG. 2 is a diagram representing a light emission characteristic of a liquid crystal display device of the related art.
Figure 3:
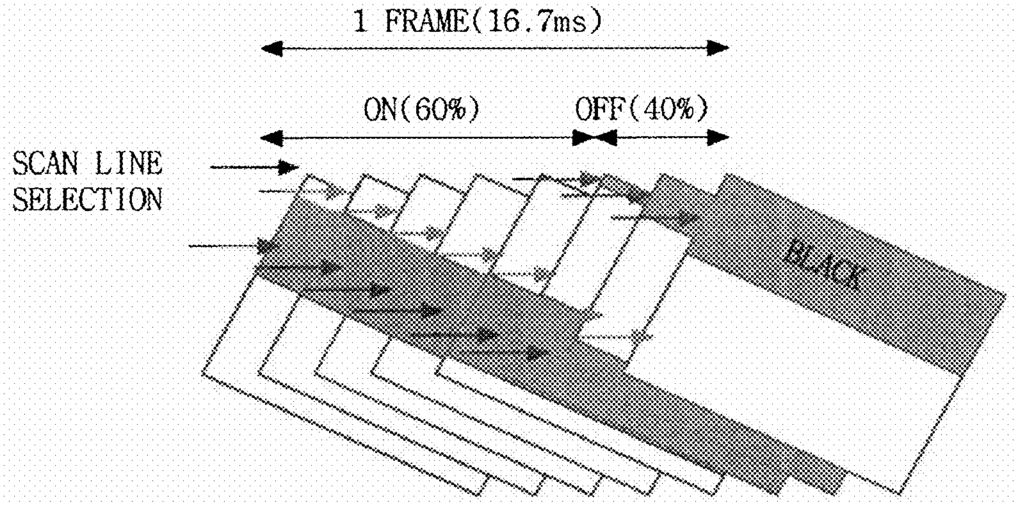
FIG.3 RELATED ART
FIG. 3 is a diagram representing a typical related art motion blurring improvement by black data insertion.
Figure 4:
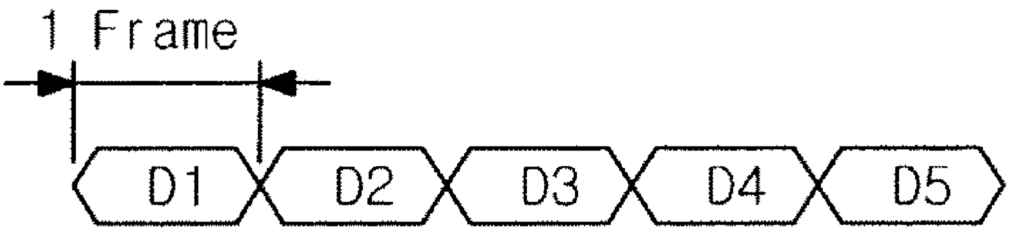
FIG. 4 RELATED ART
FIG. 4 is a diagram representing data alignment in a normal state of the related art.
Figure 5:
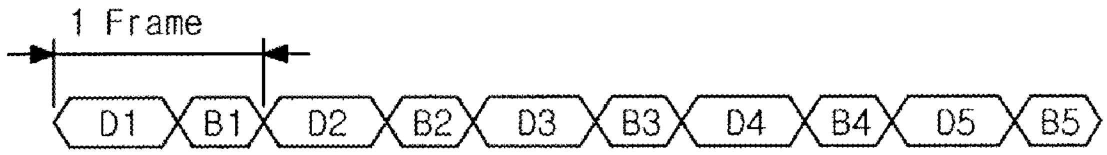
FIG. 5 RELATED ART
FIG. 5 is a diagram representing a data alignment where black data is inserted into a whole gray level area of the related art.
Figure 6:
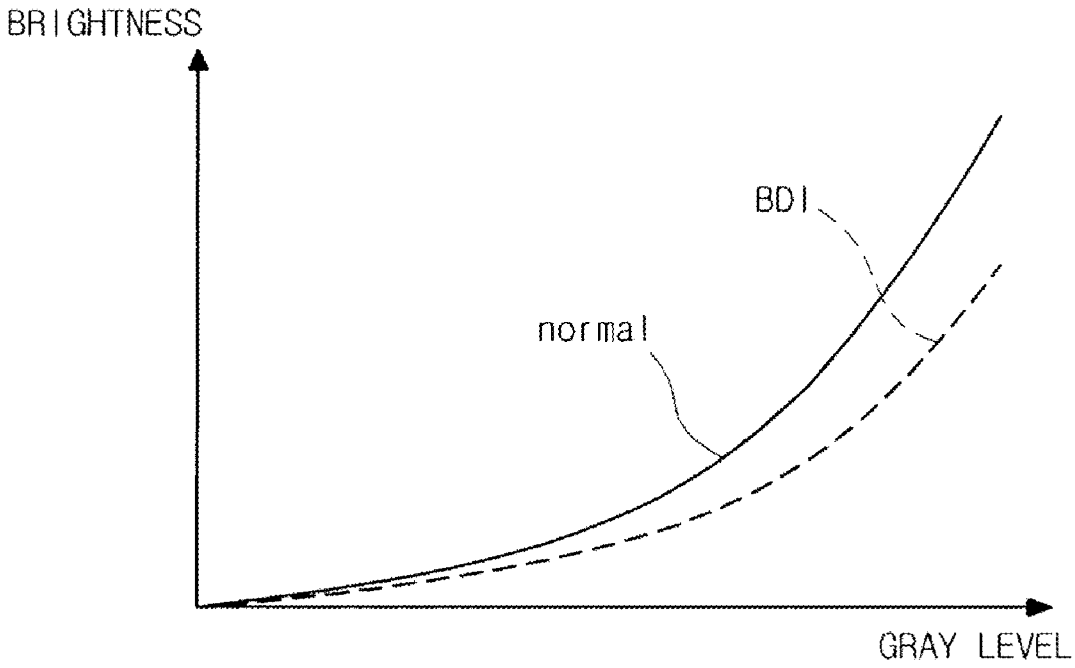
FIG. 6 RELATED ART
FIG. 6 is a graph illustrating brightness in a normal state compared with brightness when black data is inserted in the related art.

Referring to FIGS. 9 and 11, the data aligning part 82 does not insert the black data into the input or frame data D2, D3 having at least the designated reference gray level. On the contrary, the data aligning part 82 inserts the black data B1, B4, B5 into each of the input or frame data D1, D4, D5 having less than the designated reference gray level. In FIG. 9, CBDI references a brightness obtained by the data alignment where black data is inserted only in a part of the gray level area (area 1). Accordingly, brightness deterioration is minimized compared to that of the related art data alignment as shown in FIGS. 5 and 6.

As a result, the display device and the driving method thereof according to the present invention may minimize the brightness deterioration and the motion blurring phenomenon by inserting black data only for data having less than the designated reference gray level. The black data and the input or frame data into which the black is inserted are generated for one frame period.

As described above, the display device and the driving method thereof according to the present invention inserts black data only for data having less than the designated reference gray level. Thus, it is possible to minimize the brightness deterioration and the motion blurring phenomenon in a hold type display device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:

a data aligning part that analyzes a gray level of input data, inserts black data into the input data when the input data is less than a designated reference gray level value and aligns the input data and the black data; and a driver that displays an aligned data from the data aligning part in a display panel, wherein the driver includes a data driver that converts the aligned data from the data aligning part into an analog data voltage and supplies the analog data voltage to data lines of the display panel and a scan driver that sequentially supplies a scan pulse to scan lines that cross the data lines, wherein the driver further includes a timing controller that supplies the input data to the data aligning part, supplies the aligned data from the data aligning part to the data driver, and controls the data driver and the scan driver, the timing controller includes a signal controller to generate a second vertical/horizontal synchronization signal, a second clock signal and a second data enable signal using a first vertical/horizontal synchronization signal, a first clock signal and a first data enable signal, wherein the second vertical/horizontal synchronization signal, the second clock signal and the second data enable signal are signals for driving the data driver and the scan driver with the speed of 120 Hz, wherein the signal controller acts to delay the second vertical/horizontal synchronization signal, the second clock signal and the second data enable signal for a fixed period so that the signals are synchronized with the aligned data from the data aligning part, wherein when the input data is at least the designated reference gray level, the data aligning part inserts no black data for the input data and supplies the input data to the data driver for one frame, wherein the designated reference gray level value is any gray level value between the highest brightness obtained by inserting black data and a brightness higher than that, wherein the scan pulse comprises a first scan pulse synchronized with the input data supplied to the display panel and a second scan pulse synchronized with the black data supplied to the display panel.

2. The display device according to claim 1, wherein the data aligning part is embedded within the timing controller.

3. The display device according to claim 1, wherein the timing controller samples digital video data in accordance with a pixel clock.

4. The display device according to claim 1, wherein the data aligning part inserts the black data for one frame period.

5. The display device according to claim 1, wherein the display device is a liquid crystal display device or an organic light emitting diode device.

6. A displaying method, comprising:

providing a timing controller that supplies the input data to a data aligning part, supplies the data aligned by the data aligning part to a data driver, and controls the data driver and a scan driver;

generating a second vertical/horizontal synchronization signal, a second clock signal and a second data enable signal using a first vertical/horizontal synchronization signal, a first clock signal and a first data enable signal;

analyzing a gray level of input data and inserting black data into the input data when the input data is less than a designated reference gray level value;

aligning the input data and the black data;

converting an aligned data into an analog data voltage and supplying the analog data voltage to data lines of the display panel;

sequentially supplying a scan pulse to scan lines that cross the data lines; and displaying the aligned data in a display panel, wherein when the input data is at least the designated reference gray level, the data aligning part inserts no black data for the input data and supplies the input data to the driver for one frame, wherein the designated reference gray level value is any gray level value between the highest brightness obtained by inserting black data and a brightness higher than that, wherein the second vertical/horizontal synchronization signal, the second clock signal and the second data enable signal are signals for driving the data driver and the scan driver with the speed of 120 Hz, wherein the timing controller includes a signal controller for acting to delay the second vertical/horizontal synchronization signal, the second clock signal and the second data enable signal for a fixed period so that the signals are synchronized with the aligned data from the data aligning part, wherein the scan pulse comprises a first scan pulse synchronized with the input data supplied to the display panel and a second scan pulse synchronized with the black data supplied to the display panel.

7. The displaying method according to claim 6, wherein the data aligning part is embedded within the timing controller.

8. The displaying method according to claim 6, further comprising:

sampling digital video data in accordance with a pixel clock.

9. The displaying method according to claim 6, further comprising:

inserting the black data for one frame period.

10. The displaying method according to claim 6, wherein the display panel is a liquid crystal display panel or an organic light emitting diode panel.

* * * * *